United States Patent [19]

Peck

[11] Patent Number: 4,597,473

[45] Date of Patent: Jul. 1, 1986

[54] TREE STAND

[75] Inventor: Paul L. Peck, Fond du Lac, Wis.

[73] Assignee: Archery Designs, Inc., North Fond du Lac, Wis.

[21] Appl. No.: 766,799

[22] Filed: Aug. 19, 1985

[51] Int. Cl.⁴ .................... A01M 31/02; A45F 3/26; A47C 9/10

[52] U.S. Cl. .................... 182/187; 182/134; 108/152

[58] Field of Search .............. 182/187, 188, 135, 134; 108/152

[56] References Cited

U.S. PATENT DOCUMENTS

| 4,427,092 | 1/1984 | Tentler | 182/134 |
| 4,428,459 | 1/1984 | Peck | 182/187 |
| 4,488,620 | 12/1984 | Gibson | 182/187 |

Primary Examiner—Reinaldo P. Machado
Attorney, Agent, or Firm—Bayard H. Michael

[57] ABSTRACT

The tree stand has a notch which receives a tree trunk and has a flexible steel band encircling and engaging the tree. The band is positioned at an angle extending upwardly and rearwardly from the platform. The band is supported by means at each side of the platform including front and rear legs pivoted on the platform and slideably interconnected. When the legs are raised from their storage position against the platform, they are automatically locked together when they reach their operative position. One leg carries a guide which receives the band. A cylindrical member fixed on the guide supports a plunger which is biased to engage holes in the band. A cam-type actuator bears against the cylindrical member and is moved relative to the plunger between a lock position (plunger engaging the band) and a retracted position (plunger withdrawn from the band). A lock screw can fix the actuator relative to the plunger to prevent accidental movement of the actuator to the released position. This lock is independent of the lock for the legs and the locks can be operated separately. The legs are made of flat flexible metal so the legs can move sideways without need for universal joints.

10 Claims, 9 Drawing Figures

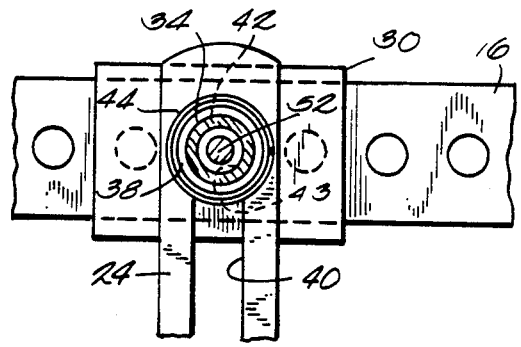
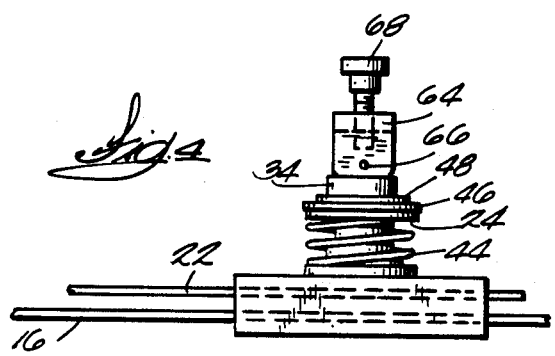
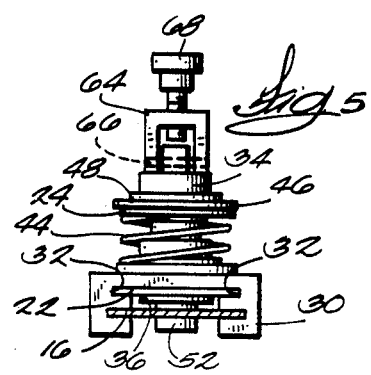
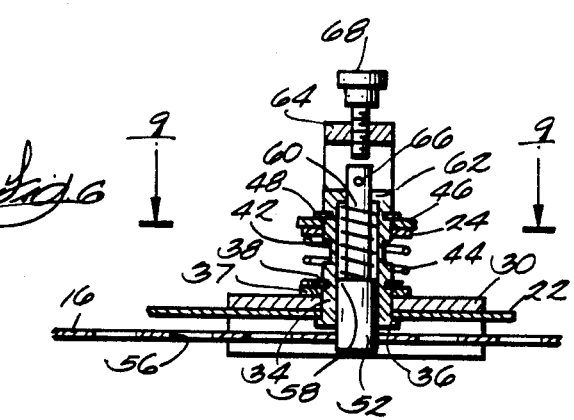
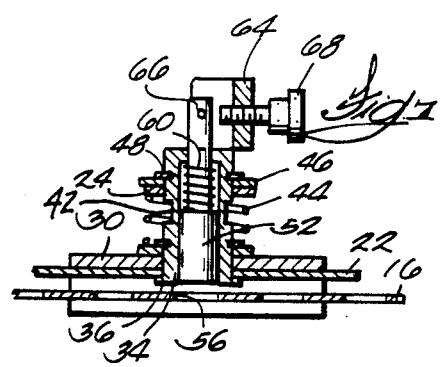
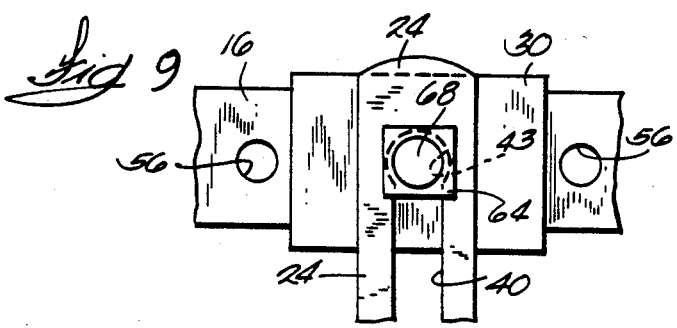
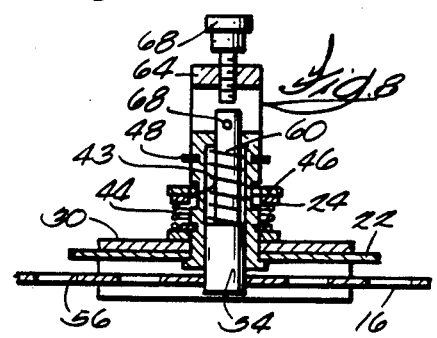

TREE STAND

BACKGROUND OF THE INVENTION

The tree stand shown in my U.S. Pat. No. 4,428,459 has many advantages over the prior art. Experience has shown the locking arrangment for the steel band which encircles the tree and which locks the support legs in operative position somewhat inconvenient. It requires both locks to be effective or ineffective at the same time. It is thought more desireable to be able to operate the locks independently.

This invention undertakes to reduce cost by improving the locking arrangement and by providing for more flexibility in the legs to avoid use of universal joints.

SUMMARY OF THE INVENTION

An important feature of this invention is the provision of a tree stand having a notch which receives a tree trunk and has a flexible steel band encircling and engaging the tree. The band is positioned at an angle extending upwardly and rearwardly from the platform. The band is supported at each side of the platform by means including front and rear legs pivoted on the platform and slideably interconnected. When the legs are raised from their storage position against the platform they are automatically locked together when they reach their operative position. One leg carries a guide which receives the band. A cylindrical member fixed on the guide supports a plunger which is biased to engage holes in the band. A cam-type actuator bears against the cylindrical member and is moved relative to the plunger between a lock position (plunger engaging the band) and a retracted position (plunger withdrawn from the band). A lock screw can fix the actuator relative to the plunger to prevent accidental movement of the actuator to the released position. This lock is independent of the lock for the legs and the locks can be operated separately.

Another feature is that the legs are made of flat flexible metal so the legs can move sideways without need for universal joints.

BRIEF DESCRIPTION OF THE DRAWINGS

FIG. 3 is a section through the post which houses the lock pin.

FIG. 4 is a detailed elevation of the locking arrangement.

FIG. 5 is an elevation from one side of FIG. 4.

FIG. 6 is a vertical section through FIG. 5.

FIG. 7 is a section like FIG. 6 but shows the cam positioned to hold the pin out of engagement with the tree-encircling band.

FIG. 8 is like FIG. 6 but shows the leg 24 depressed so the slot in the leg is aligned with the groove in the post and the leg can slide relative to the post.

FIG. 9 is a section on line 9—9 in FIG. 6.

DETAILED DESCRIPTION OF THE DRAWINGS

Figure 1:
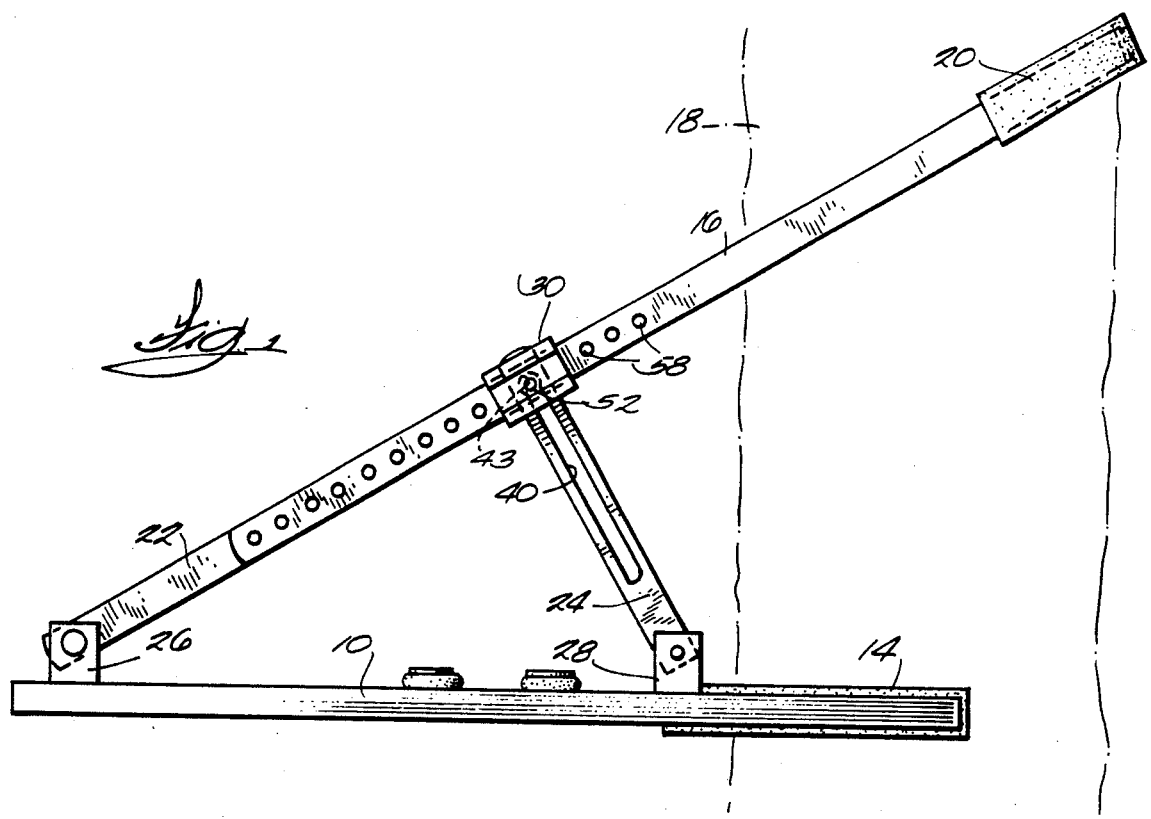
FIG. 1 is a side elevation of the tree stand erected for use on a tree shown in dashed lines.
Figure 2:
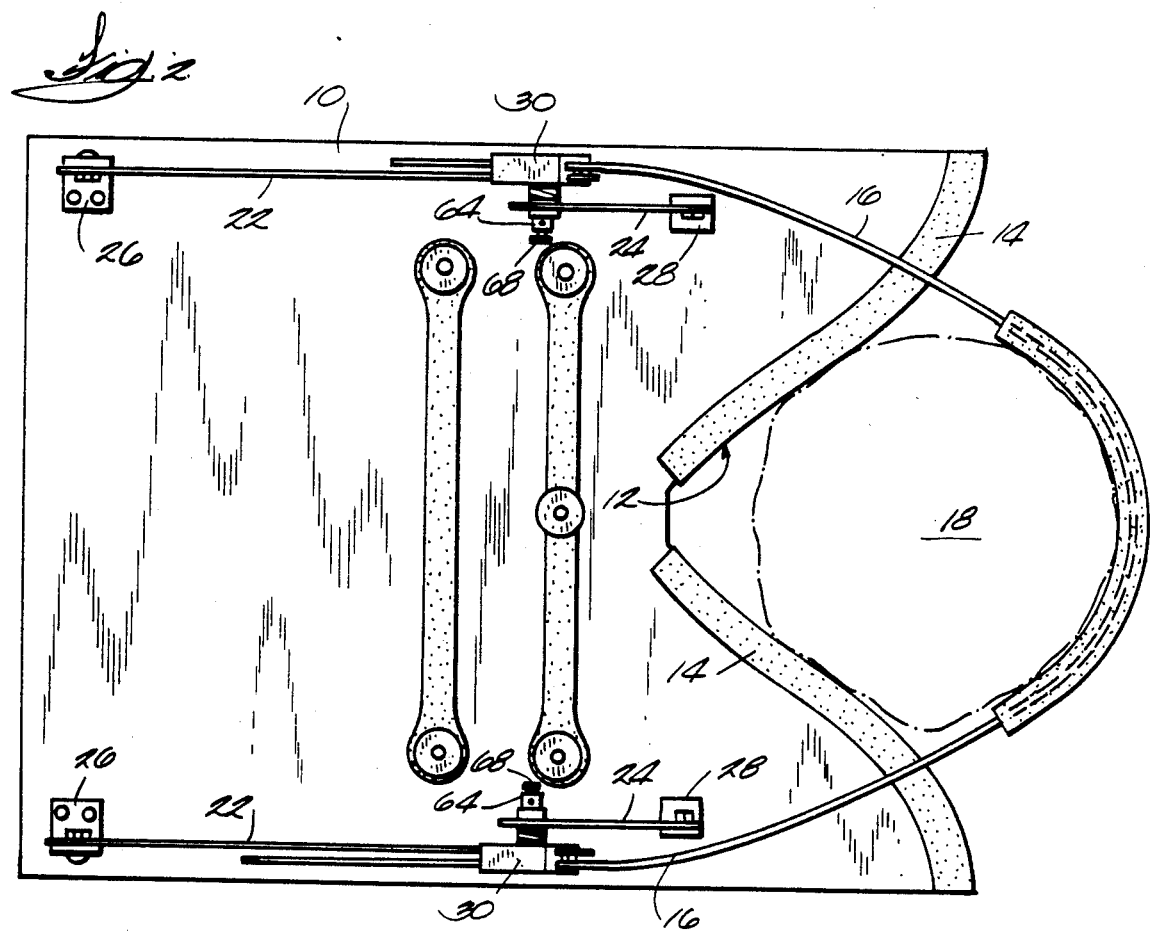
FIG. 2 is a plan view of the stand.

FIGS. 1 and 2 show a tree stand having a platform 10 provided with a notch 12 at the rear of the platform. The notch preferably has a concave-convex configuration in accordance with the teachings of Tentler U.S. Pat. No. 4,427,092. The notch is provided with a rubber extrusion 14 covering the edge of the notch and the adjacent top and bottom edge of the notch grip the tree and minimize damage to the tree. The tree stand has a steel band 16 to encircle the trunk of a tree 18 to set up a force couple driving the platform notch against the tree and thereby retain the platform on the tree. The part of the band engaging the tree is provided with a rubber sleeve 20 to avoid damage to the tree.

Support means are provided on each side of the platform 10. Each support means includes a front leg 22 and a rear leg 24. Both legs are made of flexible steel so the upper end of each leg can flex inwardly or outwardly to adapt to the size of the tree or other conditions. The lower end of each leg is pivotally connected to the platform by means of simple L-shaped brackets 26, 28. These brackets are through bolted to the platform and provide a pivotal connection so the associated leg may pivot about a horizontal axis to permit the legs to fold down against the platform for transportation and storage.

The free ends of the legs are slideably interconnected. The free end or outer end of leg 22 is provided with a guide bracket 30. The guide bracket 30 is an extruded member cut to length and has a channel-like configuration when viewed as in FIG. 5. The end of leg 22 is received in the cooperating grooves 32, 32 formed in the legs of the channel.

A cylindrical post or member 34 is mounted in a hole in the end of leg 22 and has an enlarged head 36 which lies against the leg 22. A washer 36 fits over the post on the other side of the guide bracket 30 and is held against the bracket by a snap ring 38, to thus mount member 34 perpendicular to the bracket and the leg. The strut or leg 24 is provided with a longitudinal slot 40 the edges of which are too close together to fit over the major diameter or dimension of the member 34, but which will fit over the reduced diameter or groove portion 42 of the post 34. The outer end of the slot 40 is enlarged at 43, however, as may be seen in FIG. 9. This enlarged portion or opening will fit over the post.

The leg 24 is biased outwardly from bracket 30 by spring 44. Assuming the enlarged end 43 of the slot 40 is aligned with the post the spring will move leg 24 against washer 46 retained on the post by snap ring 48. The leg 24 can lie against the washer 46 only when the legs are fully extended as in FIG. 1 since it is only at this time that the enlarged portion 42 can fit over the large diameter of the post and permit the spring to push it all the way out. Once in that position, the legs cannot be collapsed without first pushing leg 24 inwardly against the bias of spring 44 until the slot 40 is aligned with the groove 42 in the post. Now the parts can move relative to one another and the legs can be collapsed.

Means are provided for locking the band relative to the legs. The means includes the plunger or pin 50 mounted inside the cylindrical member 34 to project through the end of the post and into one of the holes 54 spaced along the length of the band 16. The lower end of the pin 52 is of larger diameter than the upper end and there is a shoulder 58 against which the compressed spring 60 may bear. The other end of the spring bears against the inner seat 62 at the upper of the post 34. The reduced diameter upper end of the pin 52 projects through the upper end of the member 34 and the inverted channel-like cam member 64 is connected to the plunger 52 by means of pivot 66. The cam limits the projection of pin 52 towards the band. A lock screw 68 is threaded through the top of the cam member 64 to bear on the upper end of the plunger if desired. If the lock pin bears against the plunger, the cam member can be pulled straight back to lift the lower end of the plunger out of the hole in the band 16 to permit the band to be adjusted. Immediately upon release of the cam member 64, the plunger will be biased back into one of the holes if and when it lines up with a hole. Such quick setting of the adjustment can be troublesome. Therefore, the lock screw 68 can be backed off to permit the cam to be pivoted 90° (FIG. 7) to one side which, of necessity, will raise the plunger out of contact with the band 16. Now the band can be adjusted to any position without the spring 60 being able to move the plunger into contact with the band. When the desired adjustment has been made, the cam is flipped back to its normal position (FIGS. 4, 5, 6) and turned down against the end of the plunger (which has in the meantime engaged a hole in the band 16) and now the band cannot be accidentally disconnected.

It may be noted that if the cam has been moved to the side as in FIG. 7, the mounting screw 68 can be turned down to pervent return of the cam to the self-locking position. This has very little purpose. The main purpose of the locking screw 68 is to insure against the hunter brushing against the cam member while using the tree stand and somehow disconnecting the lock plunger. This could cause a fall.

It will be appreciated the adjustment of the legs to the raised position is self operating, i.e. as soon as the legs have been raised to the correct position (full extension of leg 24) the mechanism automatically locks the legs in the raised position. It takes a deliberate movement of the leg 24 inwardly against the force of spring 44 to permit collapse or folding of the legs. The leg adjustment is totally independent of that involving the adjustment of the length of the band 16. The band adjustment can be accomplished with the locking plunger kept out of operation by the cam or the plunger can be manually retained out of contact until the desired position is reached. Then the user lets go of the cam and spring 60 will drive the plunger to a locking position. The adjustment of the band and the adjustment of the legs are totally separate from each other.

I claim:

1. A tree stand comprising,
a platform,
a notch in the rear of said platform adapted to receive a tree trunk,
a flexible metal band adapted to embrace the tree trunk,
support means on each side of said platform for adjustably engaging said band, each said support means including front and rear legs pivotally connected to said platform and slideably connected to each other for movement between a first position in which said legs lie against said platform and a second position in which they fix said band at an angle relative to said platform so the band engages the back of a tree above said platform,
means to automatically lock said legs in said second position as said legs are raised from said first position,
a guide fixed in one of said legs,
said band having a plurality of holes spaced therealong and being received in said guide,
a plunger reciprocally mounted on said guide for movement between a lock position engaging a hole in said band and a retracted position in which said plunger is withdrawn from said band,
a cam acting actuator pivotally connected to said plunger and moveable between positions in which said plunger is in said lock position or said retracted position,
and means to selectively fix said actuator relative to said plunger.

2. A tree stand comprising,
a platform,
a notch in the rear of said platform adapted to receive a tree trunk,
a flexible metal band adapted to embrace the tree trunk,
support means on each side of said platform for adjustably engaging said band and fixing said band at an angle relative to said platform whereby said band engages the tree trunk in back of the tree and above said platform,
each of said support means including front and rear legs pivotally connected to said platform and slideably connected to each other, said legs being flat metal flexible transversely of said platform,
leg lock means for locking and unlocking said legs relative to each other,
and band lock means for fixing said band relative to said support means,
operation of said leg lock means and said band lock means being independent of one another.

3. A tree stand according to claim 2 including a guide block fixed to one leg of each support means and receiving said band,
a member fixed transversely to said guide block,
a multiplicity of holes spaced along the length of said band,
said band lock means comprising a pin slideably mounted in said member to engage one of said holes,
a spring biasing said pin into engagement with said holes,
means for withdrawing said pin from engagement with said band,
means for selectively withdrawing said pin from engagement with said band and for retaining said pin withdrawn,
and means for preventing operation of said last named means.

4. A tree stand according to claim 2 in which said leg lock means includes a post fixed to one of said legs in each support means,
a groove in said post,
the other leg of each support means having a longitudinal slot terminating at the outer end of the leg in an enlarged opening big enough to fit over said post,
the longitudinal edges of said slot being spaced less than the thickness of said post but more than the thickness of the groove in the post,
said other leg fitting on said post with said slot or said opening fitting over the post,
a shoulder on the end of said post,
a spring biasing said other leg outwardly against said shoulder when said enlarged opening of said slot is aligned with said post.

5. A tree stand according to claim 4 including,
a guide block mounted on each of said one leg and receiving said band, a multiplicity of holes spaced along the length of said band, said band lock means comprising a pin slideably mounted in said post to engage one of said holes, a spring biasing said pin into engagement with said band, means for withdrawing said pin from engagement with said band, and means for retaining said pin withdrawn.

6. A tree stand according to claim 2 in which said leg lock means is engaged only when said legs are in their operative position, and including spring means biasing said leg lock means into engagement, said lock means being manually movable against the bias of said spring means to disengage said legs.

7. A tree stand comprising, a platform, a notch in the rear of said platform adapted to receive a tree trunk, a flexible metal band adapted to embrace the tree trunk, support means on each side of said platform for adjustably engaging said band and fixing said band at an angle relative to said platform whereby said band engages the tree trunk in back of the tree and above said platform, each of said support means including front and rear legs pivotally connected to said platform and slideably connected to each other, said legs being flat metal flexible transversely of said platform, a longitudinal slot in one of the legs of each support means, said slot having an enlarged opening adjacent the end of the leg remote from said platform, a member projecting through said slot in said one leg and fixed on the other of said legs, said member having a groove therein and a head remote from said other leg, said enlarged opening fitting over said member but not said head and said longitudinal slot fitting only over said groove in said member, a spring biasing said one leg towards said head so said one leg will lock relative to said other leg when said enlarged opening is aligned with said member.

8. A tree stand comprising, a platform, a notch in the rear of said platform adapted to receive a tree trunk, a flexible metal band adapted to embrace the tree trunk, support means on each side of said platform for adjustably engaging said band and fixing said band at an angle relative to said platform whereby said band engages the tree trunk in back of the tree and above said platform, each of said support means including front and rear legs pivotally connected to said platform and slideably connected to each other, said legs being flat metal flexible transversely of said platform, each support means including a guide block receiving said band, a multiplicity of spaced holes in said band, a lock pin reciprocally mounted on said guide block and movable between a locking position in which it engages a hole in said band and an inoperative position in which the pin is withdrawn from the hole, a spring biasing said pin to said locking position, a manually operable actuator connected to said pin for movement between a first position in which said pin is in its said locking position and a second position in which said pin is withdrawn and retained in said inoperative position and said band is freely adjustable in said guide block, and means for preventing movement of said actuator from said first position to said second position.

9. A tree stand in accordance with claim 8 in which said lock pin is slideable in a post fixed to said guide block and said actuator comprises a cam pivotally connected to said pin and bearing against said post in said first position to limit movement of said pin towards said band, said cam being pivoted about its pivot connection to said pin to move the pivot connection away from said band to a position in which said pin is withdrawn from the band, said cam being stable and bearing against said post in said second position, said means preventing movement of said actuator from said first to said second position comprising means fixing said cam relative to said pin.

10. A tree stand comprising, a platform, a notch in the rear of said platform adapted to receive a tree trunk, a flexible metal band adapted to embrace the tree trunk, support means on each side of said platform for adjustably engaging said band and fixing said band at an angle relative to said platform whereby said band engages the tree trunk in back of the tree and above said platform, each of said support means including front and rear legs pivotally connected to said platform and slideably connected to each other, leg lock means for locking and unlocking said legs relative to each other, and band lock means for fixing said band relative to said support means, operation of said leg lock means and said band lock means being independent of one another.

* * * * *